(12) United States Patent
Chen

(10) Patent No.: US 9,971,165 B2
(45) Date of Patent: May 15, 2018

(54) 3D DISPLAY APPARATUS

(71) Applicant: SHENZHEN CHINA STAR OPTOELECTRONICS TECHNOLOGY CO., LTD., Shenzhen (CN)

(72) Inventor: Jianhong Chen, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 44 days.

(21) Appl. No.: 14/418,721

(22) PCT Filed: Jan. 7, 2015

(86) PCT No.: PCT/CN2015/070248
§ 371 (c)(1),
(2) Date: Dec. 18, 2015

(87) PCT Pub. No.: WO2016/106793
PCT Pub. Date: Jul. 7, 2016

(65) Prior Publication Data
US 2016/0187665 A1   Jun. 30, 2016

(30) Foreign Application Priority Data

Dec. 30, 2014   (CN) .......................... 2014 1 0837470

(51) Int. Cl.
*G02B 27/22*   (2018.01)
*G02B 5/02*   (2006.01)
*G02B 27/00*   (2006.01)

(52) U.S. Cl.
CPC ........ *G02B 27/2214* (2013.01); *G02B 5/0263* (2013.01); *G02B 5/0278* (2013.01); *G02B 27/0025* (2013.01)

(58) Field of Classification Search
CPC .......................... G02B 27/2214; G02B 5/0268; G02B 5/0278; G02B 27/0025; G02B 5/0263;
(Continued)

(56) References Cited

U.S. PATENT DOCUMENTS

| 4,872,750 A | 10/1989 | Morishita |
| 2005/0046949 A1* | 3/2005 | Kuo ..................... G02B 5/0215 359/599 |

(Continued)

FOREIGN PATENT DOCUMENTS

| CN | 101713868 A | 5/2010 |
| CN | 102411208 A | 4/2012 |

(Continued)

*Primary Examiner* — Ricky Mack
*Assistant Examiner* — Daniele Manikeu
(74) *Attorney, Agent, or Firm* — Osha Liang LLP

(57) ABSTRACT

A 3D display apparatus is disclosed and has a display panel, a collimating backlight module, a lens array and a curved diffuser array. The lens array is mounted on the display panel and has a plurality of lens units arranged in an array manner. The curved diffuser array is mounted between the display panel and the lens array and includes a plurality of curved diffuser plates arranged in an array manner. The positions of the curved diffuser plates correspond to the positions of lens units, respectively. The light of a two-dimensional image projected by the display panel first goes through a diffusion treatment provided by the curved diffuser array, and then passes through the lens array to reconstruct a 3d scene.

8 Claims, 3 Drawing Sheets

(58) Field of Classification Search
CPC ........... H04N 13/0404; H04N 13/0406; H04N 13/042
USPC ..................................... 359/463; 348/51–60
See application file for complete search history.

(56) References Cited

U.S. PATENT DOCUMENTS

| | | | |
|---|---|---|---|
| 2005/0200962 A1* | 9/2005 | Voloschenko | G02B 5/0278 359/630 |
| 2006/0176245 A1* | 8/2006 | Sakai | G02B 27/2214 345/53 |
| 2010/0079584 A1 | 4/2010 | Sung et al. | |
| 2012/0069435 A1 | 3/2012 | Oikawa et al. | |
| 2012/0176772 A1* | 7/2012 | Maekawa | G02B 5/0231 362/97.1 |
| 2013/0050819 A1* | 2/2013 | Holmes | B42D 25/351 359/463 |
| 2013/0057159 A1* | 3/2013 | Pijlman | G02B 27/2214 315/154 |
| 2014/0085436 A1* | 3/2014 | Page | G02B 26/126 348/54 |
| 2014/0104317 A1* | 4/2014 | Tsai | G03B 21/14 345/634 |
| 2015/0293365 A1 | 10/2015 | Van Putten et al. | |

FOREIGN PATENT DOCUMENTS

| | | |
|---|---|---|
| CN | 104166242 A | 11/2014 |
| GB | 2304921 A | 3/1997 |
| WO | 2014076599 A1 | 5/2014 |

* cited by examiner

3D DISPLAY APPARATUS

BACKGROUND OF THE INVENTION

Field of the Invention

The present invention relates to a liquid crystal display apparatus, and more particularly to a 3D display apparatus that is able to improve the problem of crosstalk during 3D display.

Description of the Related Art

In order to satisfy visual experiences, image display technologies have been developed from 2D display to 3D display. Conventional 3D display technologies are mainly divided into glasses-type 3D display technology (stereoscopic display) and naked-eye 3D display technology (autostereoscopic display). The advantage of naked-eye 3D display technology is the convenience of glasses-free. The present naked-eye display technology may be carried out by using a parallax barrier, lenticular lenses or a directional backlight.

With reference to FIG. 1 and FIG. 2, FIG. 1 is a schematic diagram showing the structure of a conventional lenticular lens 3D display apparatus, and FIG. 2 is a schematic diagram showing the operation of the conventional lenticular lens 3D display apparatus. The lenticular lens 3D display apparatus is constructed by mounting a lens layer 91 consisting of multiple lenticular lens 910 in front of a liquid crystal display panel 90, wherein each one of the lenticular lenses generally covers one unit image, and each unit image includes several pixels or sub-pixels. All the unit images then form a two-dimensional image that the display panel intends to display. The lens layer 91 will project the image of the display panel into the air in a certain way, such as orthogonal projection or perspective projection, so as to reconstruct a 3D scene. Human eyes, at a specific viewing position or area, can perceive a 3D effect after being through depth cues such as binocular parallax and motion parallax. However, due to the existence of lens aberrations, human eyes at an inappropriate viewing angle (for example, a extremely large viewing angle) would perceive pixel images which are not suppose to be seen, and thereby causing an image crosstalk that will affect the 3D effect. Therefore, such design causes the viewing angle for 3D display to be more limited.

Therefore, it is necessary to provide a 3D display apparatus to overcome the problems existing in the conventional technology.

SUMMARY OF THE INVENTION

In view of the shortcomings of the conventional technologies, a main object of the present invention is to provide a 3D display apparatus so that the problem of image crosstalk during displaying 3D images can be improved.

In order to achieve the foregoing object, the present invention provides a 3D display apparatus having a display panel for providing a two-dimensional image; a collimating backlight module mounted opposite to the display panel and providing a collimating backlight source so as to project the two-dimensional image of the display panel; a lens array mounted on the display panel; and a curved diffuser array mounted between the display panel and the lens array, wherein light beams of the projected two-dimensional image first go through a diffusion treatment provided by the curved diffuser array, and then pass through the lens array to reconstruct a 3D scene.

In one embodiment of the present invention, the lens array includes a plurality of lens units arranged in an array manner; the curved diffuser array includes a plurality of curved diffuser plates arranged in an array manner; wherein the positions of the curved diffuser plates correspond to the positions of lens units, respectively.

In one embodiment of the present invention, each of the curved diffuser plates has a concave surface facing the corresponding lens unit.

In one embodiment of the present invention, each of the lens units is a lenticular lens; and the concave surface of each of the curved diffuser plates has an elongated shape matching the lenticular lens.

In one embodiment of the present invention, each of the lens units is a spherical lens; and a concave surface of each of the curved diffuser plates has a circular shape matching the spherical lens.

In one embodiment of the present invention, each of the lens unit is a double-convex lenticular lens.

In one embodiment of the present invention, each of the lens units is a double-convex lens.

In one embodiment of the present invention, the radius of curvature of each concave surface of the curved diffuser plates exhibits a predetermined relationship with respect to a spherical aberration and a radius of curvature of the lens unit.

The present invention further provides another 3D display apparatus includes: a display panel for providing a two-dimensional image; a collimating backlight module mounted opposite to the display panel and providing a collimating backlight source so as to project the two-dimensional image of the display panel; a lens array mounted on the display panel and having a plurality of lens units arranged in an array manner, wherein each of the lens units covers a corresponding unit image, and the unit image includes a plurality of pixel regions or sub-pixel regions; and a curved diffuser array mounted between the display panel and the lens array and having a plurality of curved diffuser plates arranged in an array manner; wherein the positions of the curved diffuser plates correspond to the positions of lens units, respectively; each of the curved diffuser plates has a concave surface facing the corresponding lens unit; light beams of the projected two-dimensional image first go through a diffusion treatment provided by the curved diffuser array, and then pass through the lens array to reconstruct a 3D scene.

In the 3D display apparatus of the present invention, the lens array, the curved diffuser array and the collimating backlight module are used together to achieve the object of performing a 3D scene, which is able to effectively improve the crosstalk caused by the lens aberrations of the lens array.

DETAILED DESCRIPTION OF THE PREFERRED EMBODIMENTS

The foregoing objects, features and advantages adopted by the present invention can be best understood by referring to the following detailed description of the preferred embodiments and the accompanying drawings. Furthermore, the directional terms described in the present invention, such as upper, lower, front, rear, left, right, inner, outer, side and etc., are only directions referring to the accompanying drawings, so that the used directional terms are used to describe and understand the present invention, but the present invention is not limited thereto.

Figure 1:
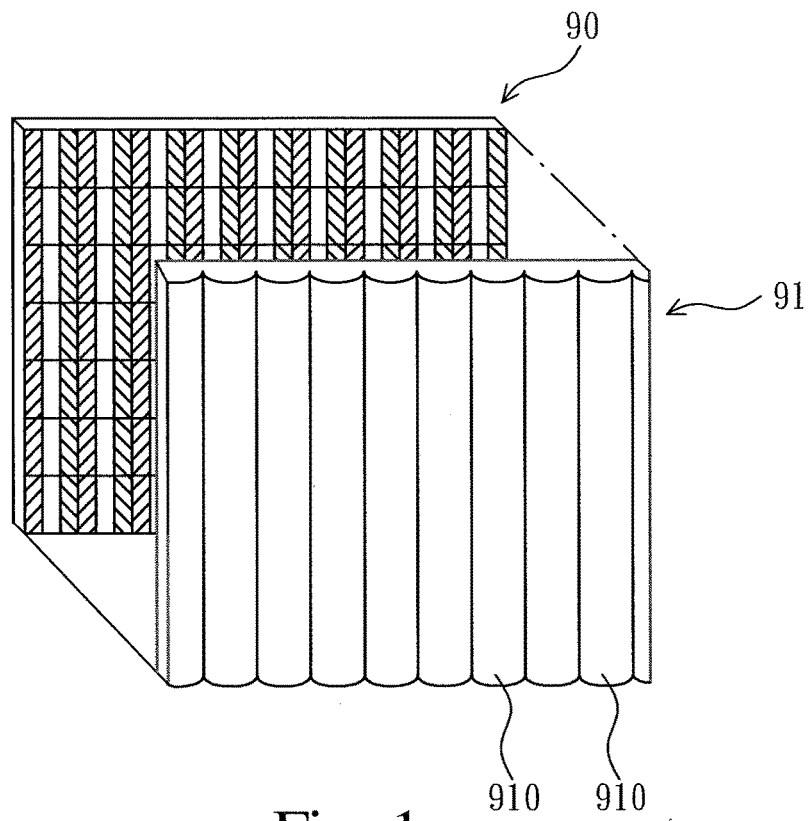
FIG. 1 is a schematic diagram showing the structure of a conventional lenticular lens 3D display apparatus.
Figure 2:
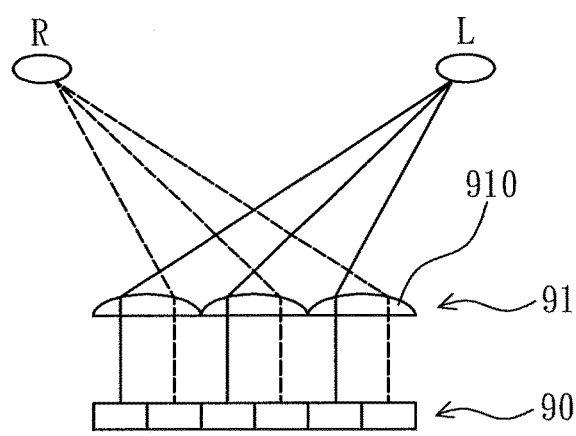
FIG. 2 is a schematic diagram showing the operation of the conventional lenticular lens 3D display apparatus.
Figure 3:
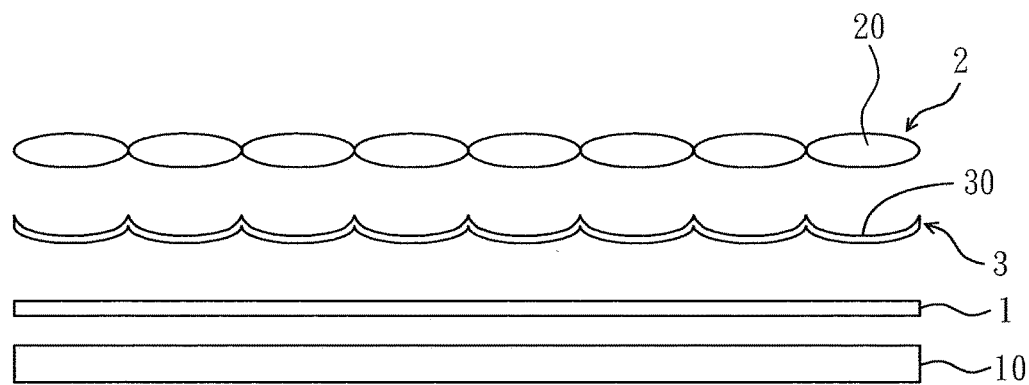
FIG. 3 is a schematic diagram showing the structure of a 3D display apparatus according to a preferred embodiment of the present invention.

With reference to FIG. 3, FIG. 3 is a schematic diagram showing the structure of a 3D display apparatus according to a preferred embodiment of the present invention. The 3D display apparatus of the present invention mainly comprises a display panel 1, a collimating backlight module 10, a lens array 2 and a curved diffuser array 3. The display panel 1 is used for providing a two-dimensional image. The lens array 2 is used to reconstruct a 3D scene according to the two-dimensional image.

The display panel 1 may be a normal liquid crystal display panel which includes a color-filter substrate, a thin-film transistor substrate and a liquid crystal layer mounted between both of the substrates. The color-filter substrate includes a plurality of photoresist units with different colors. The thin-film transistor substrate may include a plurality of scanning lines, data lines, switching elements and pixel electrodes, wherein the scanning lines and the data lines are crossed with each other to define multiple sub-pixel regions; several adjacent sub-pixel regions are then defined as a pixel region; each of the switching elements and each of the pixel electrodes are mounted in a corresponding sub-pixel region to be aligned with the corresponding photoresist unit on the color-filter substrate so as to construct a pixel array.

The collimating backlight module 10 is mounted opposite to the display panel 1 and provides a collimating backlight source so as to project the two-dimensional image of the display panel.

The lens array 2 is mounted on the display panel 1 and may be mounted on a light-exiting surface of the display panel 1 so that the two-dimensional image can be projected on the lens array 2. The lens array 2 mainly includes a plurality of lens units 20 arranged in an array manner, wherein each of the lens units 20 may cover a unit image, and each unit image may includes several pixel regions or sub-pixel regions.

As shown in FIG. 3, the curved diffuser array 3 is mounted between the display panel 1 and the lens array 2; wherein light beams of the two-dimensional image of the display panel 1 first go through a diffusion treatment provided by the curved diffuser array 3, and then are projected on the lens array 2. The curved diffuser array 3 includes a plurality of curved diffuser plates 30 arranged in an array manner. Specifically, the positions of the curved diffuser plates 30 correspond to the positions of lens units 20 of the lens array, respectively. Each of the curved diffuser plates 30 has a concave surface facing the corresponding lens unit 20. In this embodiment, a radius of curvature of the concave surface of each of the curved diffuser plates 30 exhibits a predetermined relationship with respect to a spherical aberration and a radius of curvature of the lens unit 20.

Figure 5:
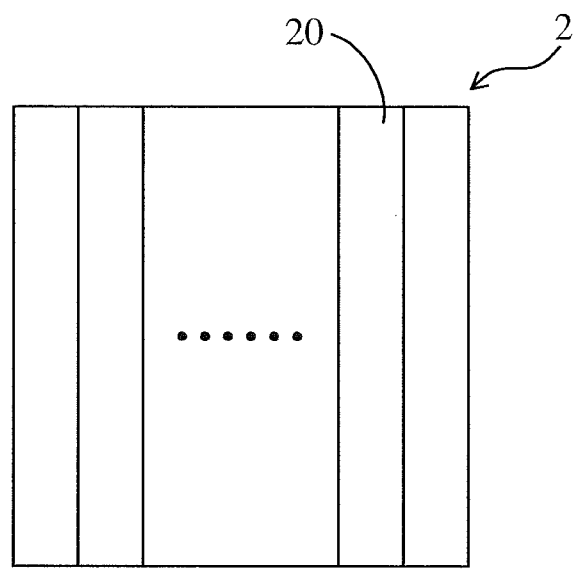
FIG. 5 is a top view of a lens array of the 3D display apparatus according to a preferred embodiment of the present invention.

In a preferred embodiment, further referring to FIG. 5, each of the lens units 20 may be a lenticular lens, such as a double-convex lenticular lens. When the lens unit 20 is a lenticular lens, the concave surface of each of the curved diffuser plates 30 has an elongated shape matching the lenticular lens.

Figure 6:
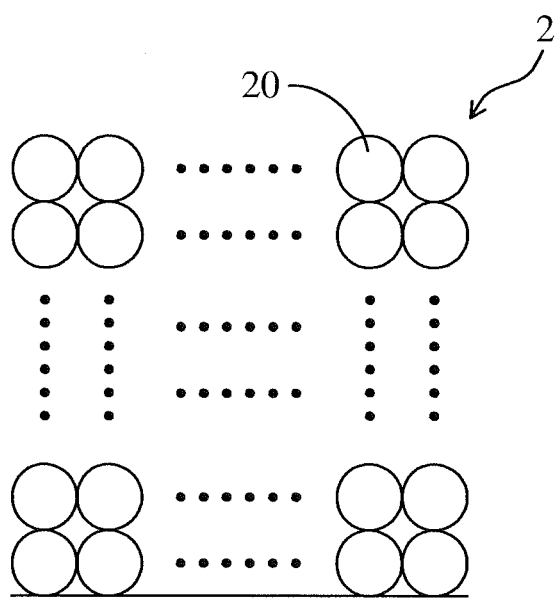
FIG. 6 is a top view of the lens array of the 3D display apparatus according to another preferred embodiment of the present invention.

In another preferred embodiment, further referring to FIG. 6, the lens unit 20 may be a spherical lens, such as a double-convex lens. When the lens unit 20 is a spherical lens, the concave surface of each of the curved diffuser plates 30 has a circular shape matching the spherical lens.

Figure 4:
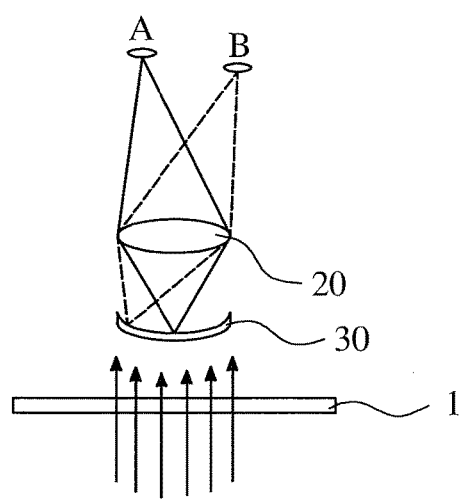
FIG. 4 is a schematic diagram showing watching images through a lens unit and a curved diffuser plate of the 3D display apparatus of the present invention at two different viewing angles.

With reference to FIG. 4, FIG. 4 is a schematic diagram showing watching images through the lens unit 20 and the curved diffuser plate 30 of the 3D display apparatus of the present invention at two different viewing angles. When a user watches the image in front of the lens unit 20 respectively at a first position A and a second position B, the light beams of the two-dimensional image of the display panel 1 will first go through the diffusion treatment provided by the curved diffuser plates 30 which has a specific curvature, and then be projected on the lens unit 20 so as to reconstruct a 3D scene using the lens unit 20, so that the user can sense a 3D effect at a specific position. Since the radius of curvature of the concave surface of the curved diffuser plate 30 exhibits a predetermined relationship with respect to the spherical aberration of the lens unit 20, after going through the diffusion treatment provided by the curved diffuser plate 30, the light beams of the two-dimensional image of the display panel 1 can be prevented from producing an image aberration when passing through the lens unit 20. Thus, with the cooperation of the curved diffuser plates 30 having a specific curvature and the lens unit 20, even at a large viewing angle, the eyes of the user can still respectively and precisely see the corresponding images provided from the display panel 1 without receiving the wrong images that leads to a crosstalk phenomenon.

In conclusion, compared with the conventional 3D display technologies having an image crosstalk problem, the lens array, the curved diffuser array and the collimating backlight module in the 3D display apparatus of the present invention are used together to achieve the object of performing 3D images, which is able to effectively improve the crosstalk phenomenon caused by the spherical aberration of the lens array itself.

The present invention has been described with preferred embodiments thereof, and it is understood that many changes and modifications to the described embodiment can be carried out without departing from the scope and the spirit of the invention that is intended to be limited only by the appended claims.

What is claimed is:

1. A 3D display apparatus comprising:
    a display panel for providing a two-dimensional image;
    a collimating backlight module mounted on a rear side of the display panel and providing a collimating backlight source so as to project the two-dimensional image of the display panel;
    a lens array mounted on a front side of the display panel and having a plurality of lens units arranged in an array manner, wherein each of the lens units covers a corresponding unit image, and the unit image includes a plurality of pixel regions or sub-pixel regions; and
    a curved diffuser array mounted between the display panel and the lens array and having a plurality of curved diffuser plates arranged in an array manner; wherein the positions of the curved diffuser plates correspond to the positions of lens units, respectively; each of the curved diffuser plates has a concave surface facing the corresponding lens unit; light beams of the projected two-dimensional image first go through a diffusion treatment provided by the curved diffuser array, and then pass through the lens array to reconstruct a 3D scene.

2. The 3D display apparatus as claimed in claim 1, wherein each of the lens units is a spherical lens; and the concave surface of each of the curved diffuser plates has a circular shape matching the corresponding spherical lens.

3. The 3D display apparatus as claimed in claim 2, wherein each of the lens units is a double-convex lens.

4. A 3D display apparatus comprising:
a display panel for providing a two-dimensional image;
a collimating backlight module mounted on a rear side of the display panel and providing a collimating backlight source so as to project the two-dimensional image of the display panel;
a lens array mounted on a front side of the display panel; and
a curved diffuser array mounted between the display panel and the lens array, wherein light beams of the projected two-dimensional image first go through a diffusion treatment provided by the curved diffuser array, and then pass through the lens array to reconstruct a 3D scene; wherein
the lens array includes a plurality of lens units arranged in an array manner; the curved diffuser array includes a plurality of curved diffuser plates arranged in an array manner; wherein the positions of the curved diffuser plates correspond to the positions of lens units, respectively; each of the curved diffuser plates has a concave surface facing the corresponding lens unit.

5. The 3D display apparatus as claimed in claim 4, wherein each of the lens units is a lenticular lens; and the concave surface of each of the curved diffuser plates has an elongated shape matching the lenticular lens.

6. The 3D display apparatus as claimed in claim 4, wherein each of the lens units is a spherical lens; and the concave surface of each of the curved diffuser plates has a circular shape matching the spherical lens.

7. The 3D display apparatus as claimed in claim 5, wherein each of the lens unit is a double-convex lenticular lens.

8. The 3D display apparatus as claimed in claim 6, wherein each of the lens units is a double-convex lens.

* * * * *